Figures 1, 2, 3:
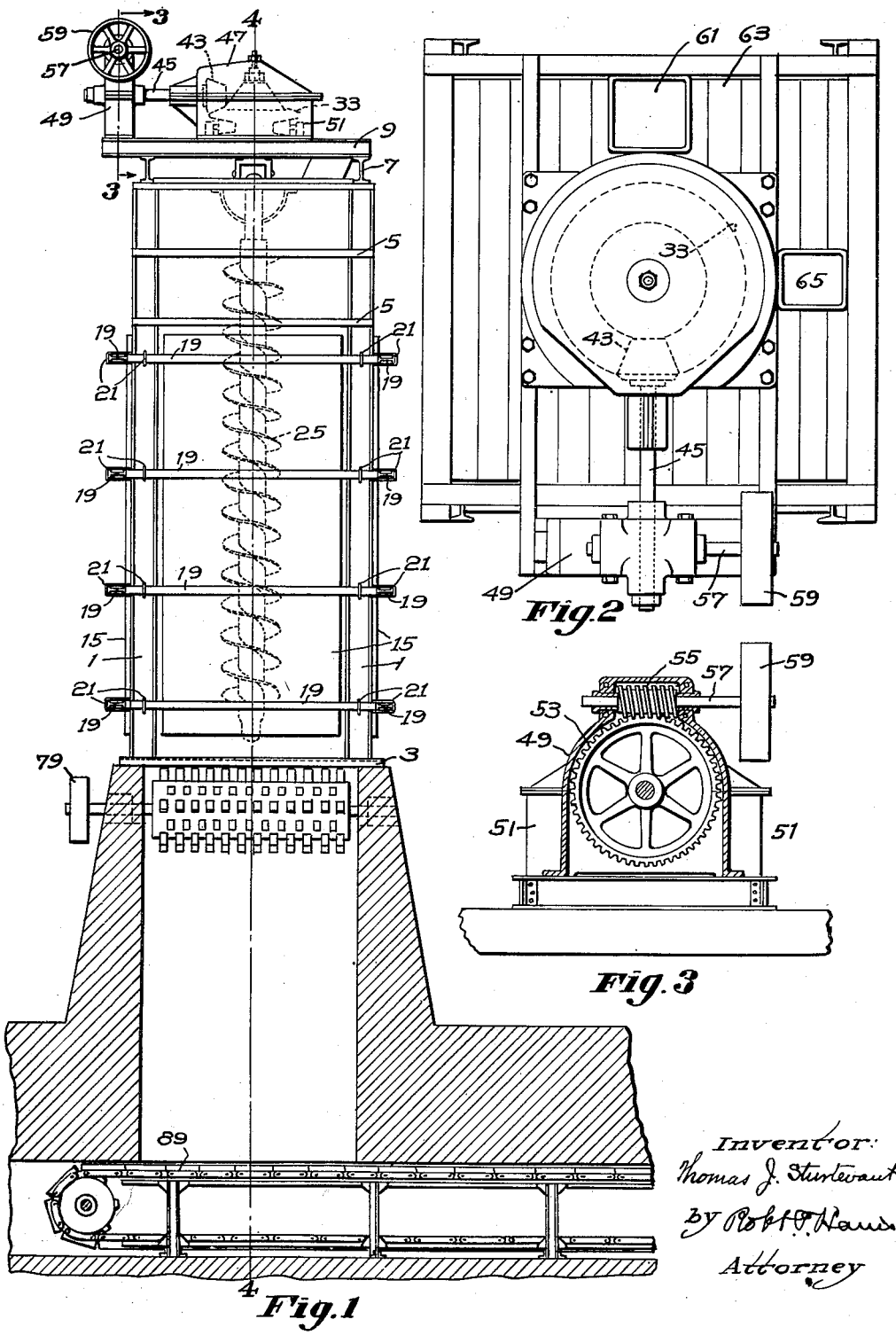

T. J. STURTEVANT.
APPARATUS FOR MANUFACTURING ACID PHOSPHATE OR SUPERPHOSPHATE.
APPLICATION FILED APR. 26, 1921.

1,428,921. Patented Sept. 12, 1922.
2 SHEETS—SHEET 1.

Inventor:
Thomas J. Sturtevant
By Robt P. Harris
Attorney

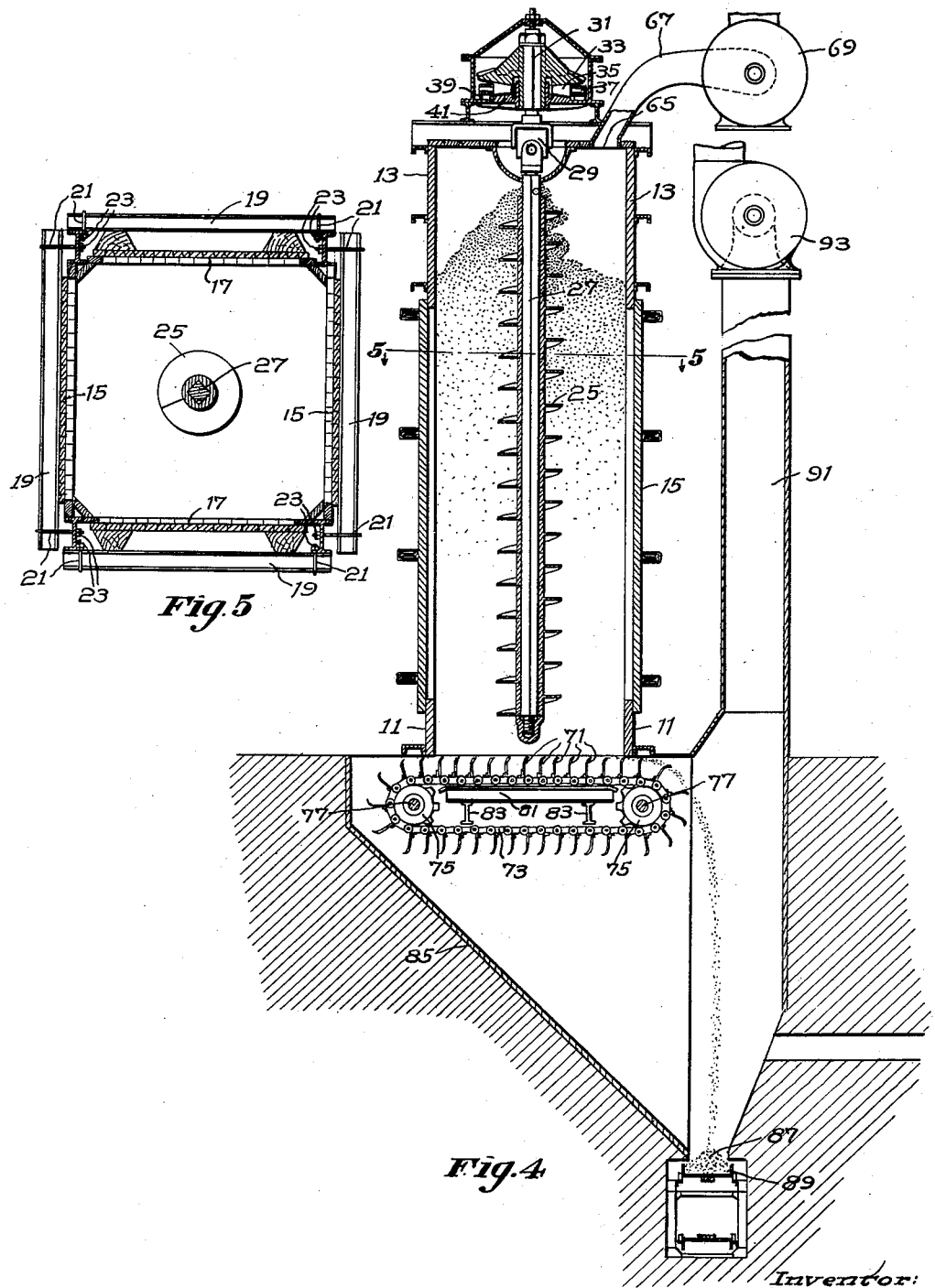

Patented Sept. 12, 1922.

1,428,921

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

APPARATUS FOR MANUFACTURING ACID PHOSPHATE OR SUPERPHOSPHATE.

Application filed April 26, 1921. Serial No. 464,649.

*To all whom it may concern:*

Be it known that I, THOMAS J. STURTEVANT, a citizen of the United States, residing at Wellesley, in the county of Norfolk and State of Massachusetts, have invented an Improvement in Apparatus for Manufacturing Acid Phosphate or Superphosphate, of which the following description, in connection with the accompanying drawings, is a specification, like characters on the drawings representing like parts.

The invention to be hereinafter described relates to apparatus for manufacturing acid phosphate or superphosphate.

Phosphate rock as it naturally occurs is unfit for use as a fertilizer, on account of its insolubility. Therefore, it is necessary to treat the phosphate rock so as to convert the insoluble phosphate therein into soluble phosphates which can be applied to the soil and be assimilated by plants.

This is usually accomplished by mixing the ground phosphate rock with an acid, such, for example, as sulphuric acid which removes two parts of the lime of the phosphate rock as gypsum and leaves one part of the lime combined with phosphoric acid as monobasic or acid phosphate of lime soluble in water.

The mixed ground phosphate rock and dilute acid are usually introduced into a den and allowed to stand therein a sufficient length of time for the chemical reaction to take place. Then the mixture is removed and conveyed to a curing pile, where it is allowed to remain a sufficient length of time for the chemical reaction to continue and further convert the insoluble phosphoric acid into soluble phosphoric acid.

There are certain objections to this method. Noxious fumes accompanying the chemical reaction taking place in the den are objectionable and injurious to workmen employed in removing the material from the den and in conveying the same to the curing pile.

The mixture of ground phosphate rock and acid when introduced into the den, is in the form of a sludge or molten mass, but after the mixture has remained in the den and the chemical reaction has progressed, the mixture changes to a spongy or more or less solid mass. This mass is picked down or disintegrated by the workmen to prepare the materials for delivery to the curing pile.

The present invention provides an apparatus whereby the mixture of ground phosphate rock and acid may be continuously delivered into the upper end of a tower or den and advanced downward therein. As the mixture progresses downward, the materials change from sludge or molten form into spongy or more or less solid form. Cutter means is provided adjacent the lower end of the tower to act on the lower or advancing face of the mass and break down or disintegrate the same. This is accomplished automatically, and requires little attention on the part of the workmen attending the apparatus.

The disintegrated materials gravitate downward and are received by a conveyor which carries the same to a curing pile where they may remain a short time to allow the chemical reaction to continue.

Means is provided automatically to draw the steam and noxious fumes from the tower, and means is provided to aerate and dry the materials as they are disintegrated.

The character of the invention may be best understood by reference to the following description of one good form of apparatus embodying the invention shown in the accompanying drawings, wherein:

Fig. 1 is a vertical section through the apparatus;

Fig. 2 on an enlarged scale is a plan of the construction shown in Fig. 1;

Fig. 3 on an enlarged scale is a vertical section taken on line 3—3 of Fig. 1;

Fig. 4 is a vertical section taken on line 4—4 of Fig. 1; and

Fig. 5 on an enlarged scale is a horizontal section taken on line 5—5 of Fig. 4.

Referring to the drawings, the apparatus shown therein as one good form of the invention, comprises a tower having a frame comprising four corner posts 1 conveniently of I-beam form connected by lower transverse I-beams or members 3 and upper transverse I-beams or members 5. At the upper end of the tower is a top frame comprising transverse I-beams or members 7 supported by the corner posts and crossing I-beams or members 9 mounted on the I-beams or members 7.

The lower portion of the tower is provided with short walls 11, and the upper portion of the tower is provided with walls 13. Interposed between the lower and upper walls are adjustable walls 15 and 17. These walls may be adjustably secured by cross bars 19 conveniently of channel form secured by yokes 21 embracing the cross bars and extending through the I-beam corner posts, the end portions of the yokes being provided with nuts 23 which enable the side walls 15 and 17 to be adjusted outward for a purpose to be described.

The tower may be provided with means for supporting the more or less solid mass of the mixture, and for feeding the same downward in the tower. This means, in the present instance of the invention, is in the form of a feed screw 25 fast on a shaft 27 having its upper end connected by a universal joint 29 with a supporting shaft 31. Mounted on this supporting shaft is a bevel gear 33 having the back face thereof resting on and supported by conical rollers 35 journalled on studs 37 carried by a ring 39 on a bearing plate 41. The conical rollers rest on a conical face of the bearing plate, and the outer ends of the conical rollers may engage the inner face of the ring 39 to limit outward axial movement of the rollers.

Meshing with the bevel gear 33 is a bevel pinion 43 (Figs. 1 and 2) fast on a shaft 45 journalled in a bearing in a casing 47 enclosing the bevel gear 33, the rollers 35 and the supporting shaft 31. The shaft 45 is also journalled in a bearing in a casing 49 (Fig. 3) supported on uprights 51 mounted on the cross beams 9 referred to.

A worm wheel 53 fast on the shaft 45 is driven by a worm 55 on a shaft 57 provided with a pulley 59 which may be driven from a suitable source of power. The construction is such that the feed screw 25 may be slowly rotated to feed the spongy or more or less solid mass downward in the tower.

The ground phosphate rock and sulphuric or other acid may be thoroughly mixed in any suitable mixer of usual construction, and therefore, unnecessary to be shown herein. The mixed materials may be continuously supplied to the tower and delivered into the same through an opening 61 in the top 63 thereof.

The steam and noxious fumes resulting from the chemical reaction occurring in the tower may be removed from the tower through an outlet 65 connected by a pipe 67 with a suitable fan 69.

At the lower end of the tower a suitable disintegrator or cutter may be provided, in the present instance, comprising a multiplicity of knives 71 (Figs. 1 and 4) carried by sprocket chains 73 on sprocket wheels 75 having shafts 77 journalled in suitable bearings. One of these shafts may have a pulley 79 fast thereon, which may be driven from a suitable source of power. The upper runs of the sprocket chains may be supported on and slide along bars 81 (Fig. 4) supported in turn by beams 83. The cutter knives are so distributed that in the upper run thereof they cover the lower open end of the tower.

Beneath the tower and receiving the cutter is a hopper 85 having an outlet 87 for delivering materials to an endless conveyor 89.

To aerate the disintegrated materials, the hopper 85 may be provided with a chimney 91 provided with a fan 93 of usual construction for drawing a current of air upward through the materials as they gravitate downward in the hopper 85.

In operation, the mixture of ground phosphate rock and acid is continuously delivered into the top of the tower through the inlet opening 61. This mixture which, as stated, is in sludge or molten form, may gravitate downward onto the cutter at the lower end of the tower. It is desirable that a quantity of ground phosphate rock shall first be placed on the knives and fill the spaces therebetween to serve as a foundation for the sludge and prevent its escape between the knives in starting the apparatus.

After the sludge has been fed into the tower in sufficient amount substantially to fill the same, the lower portion of the mass will change from sludge to spongy or more or less solid form in the course of the chemical reaction. The length of the upper fixed walls 13 of the tower is such that these walls will hold the mixture while in sludge form, and the material beneath these upper walls and extending along the adjustable walls 15 will be in spongy or more or less solid form.

The feed screw 25 will support this mass, and in the course of the rotation thereof, will gradually feed the mass downward toward the cutter. Since the tower is of non-circular form, and in the present instance, square in cross section, the mass cannot rotate with the feed screw, and consequently, the latter will rotate relatively to the mass and advance the same downward. The screw not only serves to feed the mass downward, but desirably supports the same, so that the knives do not have the burden of supporting the mass.

After the materials have solidified sufficiently, so that the feeding of the mass may be commenced, the side walls 15 and 17 are adjusted outward somewhat by adjustment of the yoke nuts 23. This prevents bond and friction between the mass and adjustable walls such as might interfere with ready feed of the mass downward by the screw.

The chemical reaction is more active when the sludge is in the upper end of the tower.

The steam and noxious fumes developed during this chemical reaction are drawn from the tower through the outlet 65 and the pipe 67.

The knives 71 of the cutter will progressively pass along and act on the lower face of the mass at the bottom of the tower, disintegrate or break down the mass, and deliver the same into the hopper 85. The construction of the knives 71 is such that they may not only have their cutting action, but also act in a sense as a fan to blow air against the materials disintegrated, and aerate and tend to dry the same. The disintegrated materials are further aerated and dried by the air current which is drawn by the chimney 91 up through the hopper.

The disintegrated materials gravitate downward in the hopper to the outlet 87, and may be transferred by the conveyor 89 to the curing pile, where the chemical reaction may further continue for a short time. Thereupon, the materials are ready for shipment and use.

By the apparatus described, the preparation or treatment of the phosphate rock may be continuously and progressively carried on, and the apparatus is largely automatic and requires little attention on the part of the workmen. Since the apparatus is substantially enclosed, and the steam and noxious fumes are drawn away from the apparatus, the workman is protected from injury therefrom.

The speed of the feed screw and the speed of the cutter may be regulated as desired for efficient operation.

It will be understood that the invention is not limited to the specific embodiment shown, and that various deviations may be made therefrom without departing from the spirit and scope of the appended claims.

What is claimed is:—

1. An apparatus for manufacturing acid phosphate, comprising, in combination, a den, means to admit the mixture of ground phosphate rock and acid into the upper end of the den, a disintegrator at the lower end of the den, and a screw conveyor mounted in said den for feeding the materials, after change to spongy mass form, down through the den to the disintegrator.

2. An apparatus for manufacturing acid phosphate, comprising, in combination, a den, means to admit a mixture of ground phosphate rock and acid into the upper end of the den, a disintegrator at the lower end of the den, and means for feeding the materials, after change from molten to spongy mass form, to the disintegrator, said feeding means having provision for sustaining the materials above the disintegrator.

3. An apparatus for manufacturing acid phosphate, comprising, in combination, a den, means to admit a mixture of ground phosphate rock and acid into the upper end of the den, a disintegrator at the lower end of the den, a supporting shaft, a feed screw, and a universal joint connecting said feed screw with the supporting shaft, said feed screw being adapted to support and feed the materials to the disintegrator after the materials have changed from molten to spongy mass form.

4. An apparatus for manufacturing acid phosphate, comprising, in combination, a den, means to admit a mixture of ground phosphate rock and acid into the upper end of the den, a disintegrator at the lower end of the den, and a screw conveyor free for swinging movement in the den and adapted to support and feed materials to the disintegrator after they have changed from molten to spongy mass form.

5. An apparatus for manufacturing acid phosphate, comprising, in combination, a den, means to admit a semi-liquid mixture of ground phosphate rock and acid into the upper end of the den, a disintegrator at the lower end of the den, and means for supporting and feeding the materials down to the disintegrator after they have changed from semi-liquid to spongy mass form.

6. An apparatus for manufacturing acid phosphate, comprising, in combination, a vertical den, means to admit a semi-liquid mixture of ground phosphate rock and acid into the upper end of the den, a disintegrator at the lower end of the den having knives adapted to cut across the lower end of the den, and a screw conveyor for supporting and feeding materials to the disintegrator after they have changed from semi-liquid to solid mass form.

7. An apparatus for manufacturing acid phosphate, comprising a den having upper fixed wall portions and lower adjustable wall portions, means to admit a mixture of ground phosphate rock and acid into the upper end of the den, and means for supporting and feeding the mixture to the disintegrator after materials have changed from semi-liquid to spongy mass form.

8. An apparatus for manufacturing acid phosphate, comprising, in combination, a den, means to admit a semi-liquid mixture of ground phosphate rock and acid into the upper end of the den, and a disintegrator at the lower end of the den comprising an endless carrier and knives mounted on said carrier adapted to act across and break down the materials after they have changed from semi-liquid to solid form.

9. An apparatus for manufacturing acid phosphate, comprising, in combination, a den, means to admit a mixture of ground phosphate rock and acid into the upper end of the den, a supporting shaft, a bearing for said shaft mounted at the upper end of the den, a screw conveyor connected to said supporting shaft for feeding the materials down through the den after they have changed from semi-liquid to solid form, and a disintegrator at the lower end of the den for breaking down the materials as they are fed thereto by the screw conveyor.

10. An apparatus for manufacturing acid phosphate, comprising, in combination, a den, means to introduce a mixture of ground phosphate rock and acid into the upper end of the den, means to liberate from the den, steam and noxious gases accompanying the chemical reaction of the materials at the upper end of the den, a disintegrator at the lower end of the den, and means to support and feed the materials down through the den to the disintegrator after they have changed from semi-liquid to solid form.

11. An apparatus for manufacturing acid phosphate, comprising, in combination, a den, means to introduce a mixture of ground phosphate rock and acid into the upper end of the den, means for feeding the materials down through the den after they have changed from semi-liquid to solid form, a hopper at the lower end of the den, and a disintegrator for breaking down the solid materials and delivering the same into said hopper.

12. An apparatus for manufacturing acid phosphate, comprising, in combination, a den, means to introduce a semi-liquid mixture of ground phosphate rock and acid into the upper end of the den, means to support and feed the mixture down through the den after change from semi-liquid to solid form, a disintegrator at the lower end of the den for breaking down the materials, and means to remove gases from the materials as they are broken down.

13. An apparatus for manufacturing acid phosphate, comprising, in combination, a den, means to introduce a semi-liquid mixture of ground phosphate rock and acid into the upper end of the den, means to support and feed the materials down through the den after change from semi-liquid to solid form, a disintegrator at the lower end of the den for breaking down the materials, a hopper for receiving the materials from the disintegrator, and a conveyor for receiving and moving the materials from the hopper.

14. An apparatus for manufacturing acid phosphate, comprising, in combination, a den, a screw conveyor mounted in said den, a hopper at the lower end of the den, a disintegrator in said hopper having knives acting across the lower end of the den, and a conveyor at the lower end of the hopper.

15. An apparatus for manufacturing acid phosphate, comprising, in combination, a den, a screw conveyor mounted in said den, a supporting shaft connected to the screw conveyor, a bearing sustaining the supporting shaft, a gear on the supporting shaft, a gear meshing therewith, means including a worm and worm gear for rotating said gears, and a disintegrator at the lower end of the den.

16. An apparatus for manufacturing acid phosphate, comprising, in combination, a den having fixed upper wall portions and an adjustable wall portion, bars for the adjustable wall portion, clamps co-operating with said bars adjustable to allow outward movement of the adjustable wall portion, means to introduce a mixture of ground phosphate rock and acid into the upper end of the den, means to feed the mixture after change from semi-liquid to solid form down through the den, and a disintegrator for breaking down the solid mixture at the lower end of the den.

17. An apparatus for manufacturing acid phosphate, comprising, in combination, a den, means to introduce a mixture of ground phosphate rock and acid into the upper end of the den, means to support and feed the mixture after change from semi-liquid to solid form down through the den, a disintegrator at the lower end of the den comprising an endless carrier having knives thereon to break down the solid materials, and means to sustain and guide the upper run of the endless carrier.

18. An apparatus for manufacturing acid phosphate, comprising, in combination, a den, means for delivering a semi-liquid mixture of ground phosphate rock and acid to the den to remain therein until the mixture solidifies, a disintegrator positioned below the mixture within the den so that the weight of the mixture tends to move the solidified mixture into position to be acted upon and disintegrated by the disintegrator, and means for operating the disintegrator.

19. An apparatus for manufacturing acid phosphate, comprising, in combination, a den having its walls constructed to permit a mixture that has solidified therein to move downwardly to the lower end of the den, means for delivering a semi-liquid mixture of ground phosphate rock and acid to the den to remain therein until the mixture solidifies, and a disintegrator positioned below the mixture that has solidified within the den and operable continuously to remove solid material from the lower face of the mixture during the delivery of semi-liquid material to the upper part of the den.

20. An apparatus for manufacturing acid phosphate, comprising, in combination, a den, means for delivering a semi-liquid mixture of ground phosphate rock and acid to the den to remain therein until the mixture solidifies, a disintegrator positioned below the mixture, and means for effecting downward movement of the mixture within the den to bring the mixture that has solidified into position to be acted upon by the disintegrator.

21. An apparatus for manufacturing acid phosphate, comprising, in combination, a den for forming an acid phosphate block, a disintegrator positioned below the block to act upon the lower face of the block, means for feeding the block downwardly toward the disintegrator, and means for operating the disintegrator to excavate the block.

In testimony whereof, I have signed my name to this specification.

THOMAS J. STURTEVANT.